United States Patent [19]

Yabe et al.

[11] Patent Number: 4,944,967
[45] Date of Patent: Jul. 31, 1990

[54] PROCESS FOR THE PREPARATION OF INFORMATION RECORDING MEDIUM

[75] Inventors: Masao Yabe, Shizuoka; Yoshio Inagaki, Kanagawa, both of Japan

[73] Assignee: Fuji Photo Film Co., Ltd., Kanagawa, Japan

[21] Appl. No.: 280,358

[22] Filed: Dec. 6, 1988

[30] Foreign Application Priority Data

Dec. 7, 1987 [JP] Japan .................................. 62-310283

[51] Int. Cl.$^5$ ......................... B05D 3/02; G11B 7/24
[52] U.S. Cl. ............................... 427/393.5; 346/135.1; 430/270; 430/495; 430/945
[58] Field of Search ...................... 430/270, 495, 945; 346/135.1; 427/161, 261, 288; 106/20, 22

[56] References Cited

U.S. PATENT DOCUMENTS 4,175,145 11/1979 Fechter .................................. 427/240
4,778,525 10/1988 Kobayashi et al. ............... 106/22 X
4,798,781 1/1989 Hirose et al. .................... 430/945 X

*Primary Examiner*—Michael Lusignan
*Attorney, Agent, or Firm*—Sixbey, Friedman, Leedom & Ferguson

[57] ABSTRACT

A process for the preparation of an information recording medium comprising a substrate and a recording layer for writing and/or reading information by means of a laser beam which is provided on the substrate, wherein said recording layer is formed on the substrate by coating a solution which contains a dye in a solvent containing diacetone alcohol over the substrate to form a dye-coated layer, and drying the coated layer is disclosed. Also disclosed is a process for the preparation of an information recording medium comprising a substrate, an intermediate layer and a recording layer, superposed in order.

7 Claims, No Drawings

PROCESS FOR THE PREPARATION OF INFORMATION RECORDING MEDIUM

BACKGROUND OF THE INVENTION

1. Field of the Invention

The present invention relates to a process for the preparation of an information recording medium for writing and/or reading information by means of a laser beam having high energy density.

2. Description of Prior Art

Information recording media for recording and/or reproducing information by the use of a laser beam of high energy density have been developed in recent years and are put into practical use. Such recording media have been widely utilized in various fields, for example, as an optical disc such as a video disc and an audio disc as well as a disc memory for a large-capacity computer and a large-capacity static image file, a micro-image recording medium, an ultramicro-image recording medium, a micro-facsimile, and an optical card.

The information recording medium basically comprises a transparent substrate of plastic or glass material and a recording layer provided on the substrate. As materials of the recording layer, metals such as Bi, Sn, In and Te or semimetals, and dyes such as a cyanine dye, a metal complex compound and a quinone dye are generally known.

Writing of information on the recording medium can be conducted, for example, by irradiating the medium with a laser beam. Under irradiation with the laser beam, the irradiated area of the recording layer of the recording medium absorbs energy of the beam and rise of temperature locally occurs and, as a result, a chemical or physical change is caused to alter (or change) optical characteristics of the recording layer in the irradiated area, whereby the recording of information is made. Reading of the information from the recording medium is also conducted by irradiating the medium with a laser beam. The information can be reproduced by detecting reflected light or transmitted light corresponding to the change in the optical characteristics of the recording layer.

Recently, an optical disc having an air-sandwich structure for protecting the recording layer has been proposed. The optical disc of air-sandwich structure comprises two disc-shaped substrates, a recording layer provided on at least one of the substrates and two ring-shaped spacers (inner spacer and outer spacer), said two substrates interposing the recording layer being combined with each other in such a manner that a closed space is formed by the two substrates and the two spacers. In such recording medium, the recording layer is kept from direct exposure to an outer air, and recording or reproduction of information is carried out by applying a light of the laser beam to the recording layer through the substrate, whereby the recording layer is generally kept from physical or chemical damage. Further, the surface of the recording layer can be kept from deposition of dust which likely causes troubles ub the recording and reproducing procedures.

An information recording medium using a dye as a recording material is excellent in various characteristics required for recording media such as high sensitivity, and additionally the medium has other advantageous features such that the recording layer can be easily formed on the substrate by a conventional coating method. In general, most of dyes including a cyanine dye are poor in solubility, so that in the preparation of a coating solution using those dyes, solvents having high dissolving power for those dyes such as halogenated hydrocarbons (e.g., dichloromethane and dichloroethane) are generally utilized.

However, a substrate made of plastic material has poor resistance to those halogenated hydrocarbons, and the surface of the substrate is easily dissolved in the coating solution when the solution is coated over the substrate. As a result, there occur various troubles such that protruded and depressed portions serving as tracking groove on the surface of the substrate disappear, or a portion of material of the substrate is migrated into the recording layer. For coping with such troubles, Japanese Patent Provisional Publication No. 59(1984)-217241 proposes that the plastic substrate be beforehand subjected to an insolubilizing treatment to reduce dissolution by the halogenated hydrocarbon solvent.

SUMMARY OF THE INVENTION

It is an object of the present invention to provide a process for the preparation of an information recording medium using a novel solvent.

It is another object of the invention to provide a process for the preparation of an information recording medium by which the recording layer of uniform thickness is formed on the substrate by a generally employed coating method without risk of dissolving the substrate.

It is a further object of the invention to provide a process for the preparation of an information recording medium by which the recording medium can be easily prepared.

There is provided by the present invention a process for the preparation of an information recording medium comprising a substrate and a recording layer for writing and/or reading information by means of a laser beam which is formed on the substrate, wherein said recording layer is formed on the substrate by coating a solution which contains a dye dissolved in a solvent containing diacetone alcohol over the substrate to form a coated layer, and drying the coated layer. There is also provided by the invention a process for the preparaion of an information recording medium comprising a substrate, an intermediate layer and a recording layer, superposed in order, wherein said intermediate layer is formed on the substrate by coating a solution which contains a polymer dissolved in a solvent containing diacetone alcohol over the substrate to form a coated layer, and drying the coated layer, and a recording layer comprising a dye or metal is formed on the intermediate layer.

According to the present invention, diacetone alcohol is used alone or in combination with other solvent as a solvent for preparing a coating solution for the formation of either a recording layer containing a dye as a recording material or an intermediate layer of a polymer serving as a undercoating for the recording layer. Such coating solution can be easily prepared, and the coating layer of uniform thickness can be formed using the coating solution of the invention. By the use of a solvent containing diacetone alcohol, the substrate is prevented from being dissolved in the coating solution.

The diacetone alcohol employed as a solvent in the invention has a high dissolving power for a dye such as a cyanine dye and also for a polymer, so that a coating solution for the formation of the recording layer or the intermediate layer can be easily prepared. Further, since the substrate made of a plastic material such as polycarbonate is insoluble in this compound, the substrate is not dissolved during the coating procedure.

Accordingly, the process for the invention can give an information recording medium improved in various properties without bringing about the aforementioned troubles such as disappearance of a groove on the surface of the substrate and lowering of reflectance of the recording layer. Moreover, it is unnecessary to subject the substrate to insolubilizing treatment against the solvent, and hence the recording medium can be prepared by a simple process at a low manufacturing cost.

The intermediate layer of the invention means a layer coated on the substrate for the purpose of improving smoothness, recording properties or other characteristics, and includes an undercoating layer.

DETAILED DESCRIPTION OF THE INVENTION

According to the present invention, an information recording medium can be prepared, for example, by the following process.

A coating solution for the formation of an intermediate layer or a recording layer is first prepared using a solvent containing diacetone alcohol. Thus prepared coating solution is then coated over a substrate, and thus coated layer is dried to form an intermediate layer (a polymer layer containing no dye) or a recording layer (a layer comprising a dye).

A material of the substrate employable in the invention can be selected from any materials which are used as the substrates of the conventional recording media. From the view point of optical characteristics, smoothness, workability, handling properties, long-term stability and manufacturing cost, preferred examples of the substrate materials include acrylic resins such as cellcast polymethyl methacrylate and injection-molded polymethyl methacrylate; vinyl chloried resins such as polyvinyl chloride and vinyl chloride copolymer; epoxy resins; polycarbonte resins; amorphous polyolefins; and polyesters.

A substrate can be provided with a pregroove, and such substrate can be prepared by injection molding using a die having a pattern corresponding to the pregroove and using a plastic materials such as polycarbonate resins, polyacrylic resins, chloride vinyl resins, epoxy resins or amorphous polyolefin (preferably employed is polycarbonate, polymethyl methacrylate or amorphous polyolefin). Otherwise, a substrate having a pregroove can be prepared by placing a resin layer having the pregroove on a plain substrate.

The intermediate layer can be formed on the substrate by a conventional spin coating method.

Examples of the intermediate layer formed on the substrate include an adhesive layer, a thermal-insulating layer, a reflecting layer, and a sensivity increasing layer (gas generating layer).

Examples of polymer materials for the preparation of the intermediate layer include polymethyl methacrylate, acrylic acid/methacrylic acid copolymer, styrene/maleic anhydride copolymer, polyvinyl alcohol, N-methylol/acrylamide copolymer, styrene/sulfonic acid copolymer, styrene/vinyltoluene copolymer, chlorinated polyethylene, chlorosulfonated polyethylene, nitrocellulose, polyvinyl chloride, polyimide, vinyl acetate/vinyl chloride copolymer, ethylene/vinyl acetate copolymer, polyethylene, polypropylene, and polycarbonte. The intermediate layer is formed on the substrate employing a coating solution in which these polymers are dissolved in a solvent containing diacetone alcohol.

Diacetone alcohol is employed alone or in combination with other solvent as a solvent for the preparation of a coating solution, which is a characteristic requisite of the invention. In the case of using diacetone alcohol in combination with other solvent, diacetone alcohol should be contained in an amount of at least 10 weight % of the total amount, preferably in an amount of at least 50 weight %, and more preferably at least 90 weight %.

Since diacetone alcohol has a carbonyl group and a hydroxyl group in its molecular structure, it has characteristics of a ketone as well as an alcohol. Accordingly, the diacetone alcohol hardly dissolve polymer materials employed for the formation of a substrate. On the other hand, the diacetone alcohol has considerable dissolving power for dye described hereinafter, because the dyes are low molecular weight compounds. Further, the diacetone alcohol shows a necessary dissolving power for polymers for the formation of an intermediate layer, because such polymers are reletively low-molecular weight compounds.

As is described above, the diacetone alcohol has a relatively high dissolving power for the polymers of the intermediate layer but has a poor dissolving power for the material of the substrate. Further, it is noted that diacetone alcohol has a high-boiling point, which favorably functions for increasing spreadability of the coating solution on the substrate. Accordingly, the use of diacetone alcohol as a solvent of a coating solution for the formation of an intermediate layer or a recording layer favorably effect to the formation of a coated layer having smooth surface and uniform thickness.

As described above, the above-mentioned diacetone alcohol can be employed singly or in combination with other solvents, so long as the ratio of mixture is in the range of amount mentioned above.

Examples of the solvents employable in combination with diacetone alcohol for the preparation of the coating solution include known solvents such as aromatic hydrocarbon (e.g., toluene and xylene), esters (e.g., ethyl acetate, butyl acetate and cellosolve acetate), ketones (e.g., methyl ethyl ketone, methyl isobutyl ketone, and cyclohexanone), halogenated hydrocarbons (e.g., dichloromethane, 1,2-dichloroethane and chloroform), amides (e.g., dimethylformamide), sulfoxides (e.g., dimethylsulfoxide), cyclic hydrocarbons (e.g., cyclohexane), ethers (e.g., tetrahydrofuran, dioxane, and diethyl ether), and alcohols (e.g., ethanol, n-propanol, isopropanol and n-butanol).

The thickness (average thickness) of the intermediate coated layer is determined in consideration of property required for the intermediate layer. The thickness of the layer generally is in the range of 50 to 5,000 angstroms, and preferably 100 to 1,000 angstroms.

On the intermediate layer is then provided a recording layer. In the case of a metal is employed for the formation of a recording layer, examples of the material employable include metals such as Te, Zn, In, Sn, Zr, Al, Cu and Ga; semi-metals such as Bi, As and Sb; semiconductors such as Ge and Si; and their alloys and various combinations thereof. Further, sulfides, oxides, borides, silicides, carbides and nitrides of these metals these semi-metals and mixtures of these compounds and the above stated metals can be also employed as the material of the recording layer.

The recording layer made of metal can be formed on the intermediate layer by means of metallizing, sputtering or ion plating process. The recording layer may be composed of a single layer or plural layers. The thickness of the layer is generally in the range of 100 to 5,500 angstroms from the view poit of optical density required for the optical recording.

A recording layer comprising a dye can be formed in place of the metallic recording layer. The recording layer made of a dye can be formed directly on the substrate. If the intermediate layer is not provided, a coating solution containing a dye is directly coated on the substrate.

The dye-type recording layer is a layer comprising substantially only a dye, or a layer comprising a dye dispersed in a binder.

The dye employable in the present invention can be selected from those conventionally used as recording materials of information recording media. Examples of the dyes include a cyanine dye, a phthalocyanine dye, a pyrylium dye, a thiopyrylium dye, an azulenium dye, a squarillium dye, a metal complex salt dye such as dyes containing Ni or Cr, a naphthoquinone dye, an anthraquinone dye, an indophenol dye, an indoaniline dye, a triphenylmethane dye, a triallylmethane dye, an aminium dye, a diimmonium dye and a nitroso compound.

Among those dyes, preferred are dyes showing high absorption for a light in the wavelength region of near infrared such as 700 to 900 nm, because a semiconductor laser emitting the near-infrared rays is used in practic as a laser for recording and reproducing information.

Examples of such dyes showing high absorption are as follows.

Cyanine dye:

(1) $(CH_3)_2N-(CH=CH)_5-CH=^+N(CH_3)_2 ClO_4^-$ (2)

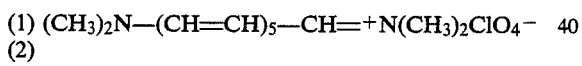

in which n is 2 or 3.

(3)

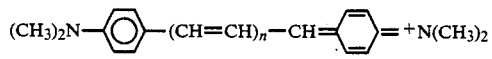

in which R is hydrogen atom or $N(CH_3)_2$.

(4) $A-(CH=CH)_n-CH=B$ in which A is

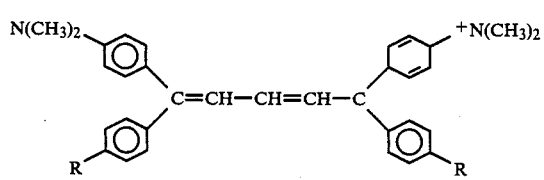

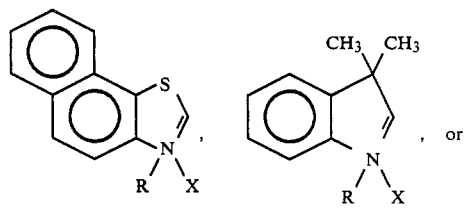

B is

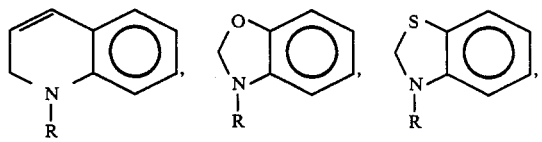

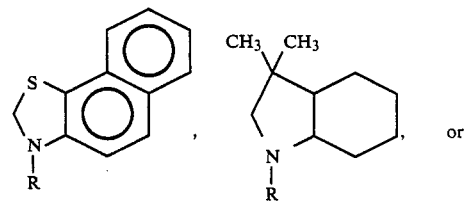

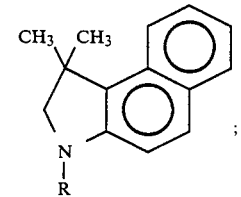

in which R is an alkyl group; X is a counter ion; the benzene ring or the naphthalene ring may have chlorine atom, an alkyl group, an alkoxy group or an aryl group as substituent; and n is an integer of 0 to 3.

(5)

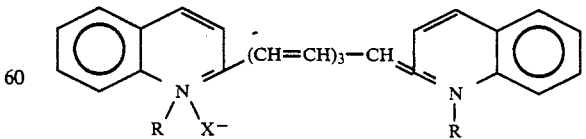

in which R is an alkyl group, and X is an anion such as halogen, perchlorate, $RF_6^-$, perfluoroalkane sulfonate, or a substituted or unsubstituted benzene sulfonate.

(6)

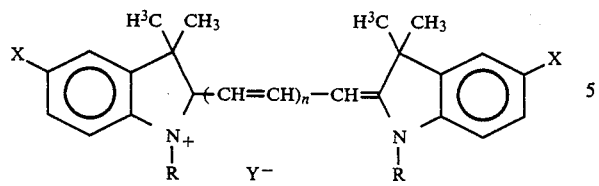

5 in which R is a group of a substituted or unsubstituted alkyl, alkoxy, aralkyl or alkenyl; X is a hydrogen atom or a halogen atom; Y is an anion such as a halogen atom, perchlorate, a substituted or unsubstituted benzene sulfonate, paratoluene sulfonate, methyl sulfate, ethyl sulfate, benzenecarboxylate, methyl carboxylate or trifluoromethyl carboxylate; and n is an integer of 0 to 3.

(7)

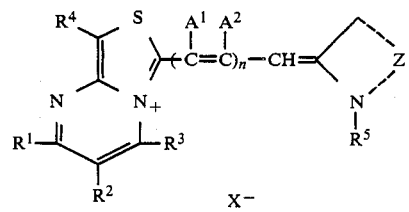

in which each of $A^1$ and $A^2$ is hydrogen atom or a substituent; Z is an atom group required for forming a 5 membered heterocyclic ring; each of $R^1$ to $R^4$ is hydrogen atom or a substituent; $R^5$ is a substituent or may form a 6 membered heterocyclic ring; $X^-$ is an anion; and n is an integer of 0 to 2.

(9)

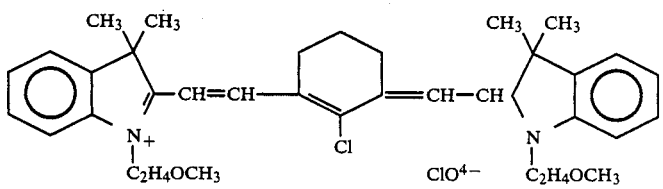

(10)

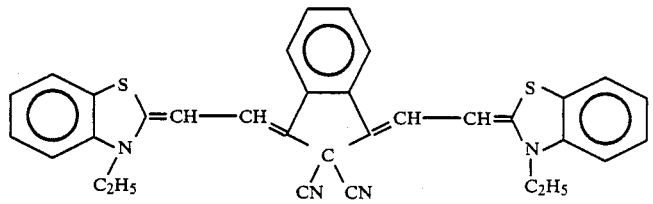

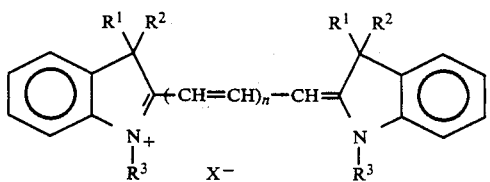

in which each of $R^1$, $R^2$ and $R^3$ is a substituted or unsubstituted alkyl group, and $R^1$, $R^2$ and $R^3$ may be the same or different from each other; $X^-$ is an anion such as a perhalogenate ion, $RF_6^-$, a substituted or unsubstituted benzene sulfonate, perfluoroalkane sulfonate, or an alkylsulfate; n is an integer of 0 to 3; a halogen atom exists on at least one of the forth, fifth, sixth and seventh positions of the indolenine ring, and a halogen atom may exist on another unit of the indolenine ring; and the benzene ring may be substituted with an alkyl group, an alkoxy group, hydroxyl, carboxyl, an allyl group or an alkylcarbonyl group.

(8)

(11) $\Phi-L=\Psi(X^-)_m$ in which each of $\Phi$ and $\Psi$ is a residual group of an indole ring, a thiazole ring, an oxazole ring, a selenazole ring, an imidazole ring or a pyridine ring which may be condensed with an aromatic ring; L is a connecting unit for forming monocarbocyanine, dicarbocyanine, tricarbocyanine or tetracarbocyanine; $X^-$ is an anion; and m is 0 or 1.

Squarillium dye:

(12)

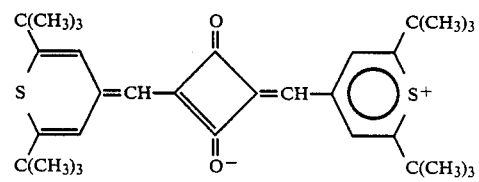

(13)

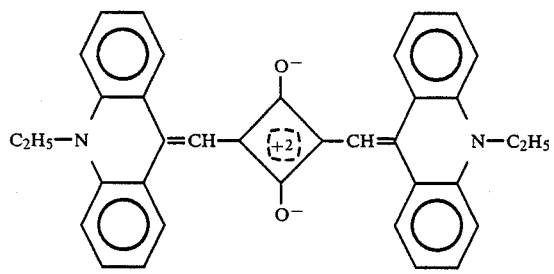

Azulenium dye:
(14)

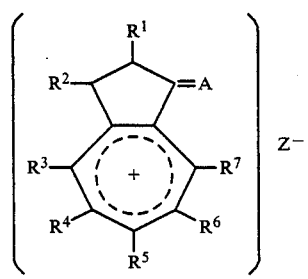

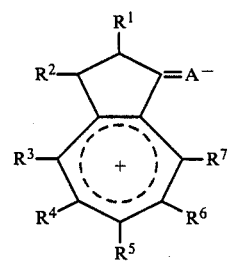

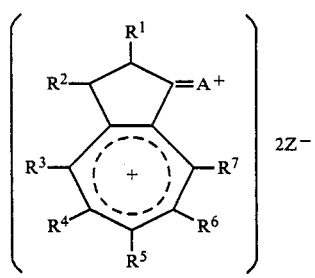

in which at least one combination of $R^1$ and $R^2$, $R^2$ and $R^3$, $R^3$ and $R^4$, $R^4$ and $R^5$, $R^5$ and $R^6$, and $R^6$ and $R^7$ forms a substituted or unsubstituted heterocyclic ring or aliphatic ring, and each of $R^1$, $R^2$, $R^3$, $R^4$, $R^5$, $R^6$ and $R^7$ is hydrogen atom, a halogen atom or a monovalent organic residual group when they do not form said ring; at least one combination of $R^1$ and $R^2$, $R^3$ and $R^4$, $R^4$ and $R^5$, $R^5$ and $R^6$, and $R^6$ and $R^7$ may form a substituted or unsubstituted aromatic ring; A is a divalent organic residual group bonded through a double bond; and $Z^-$ is an anionic residual group. Herein, at least one carbon atom constituting the azulene ring may be substituted with nitrogen atom to form an azazulene ring.

Indophenol dye:
(15)

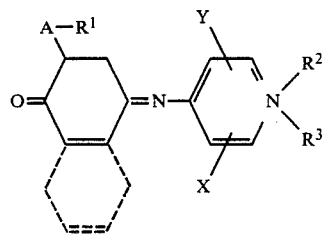

in which each of X and Y is a hydrogen atom, an alkyl group, an acylamino group, an alkoxy group or a halogen atom; each of $R^1$, $R^2$ and $R^3$ is a hydrogen atom, a substituted or unsubstituted alkyl group, an aryl group, a heterocyclic ring or cyclohexyl group having 1–20 carbon atoms; and A is —NHCO— or —CONH—.

Metal complex salt dye:
(16)

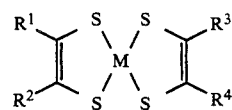

in which each of $R^1$ to $R^4$ is an alkyl group or an aryl group; and M is a divalent transition metal atom.

(17)

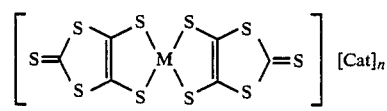

in which each of $R^1$ and $R^2$ is an alkyl group or a halogen atom; M is a divalent transition metal atom.

(18)

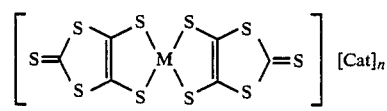

in which each of $R^1$ and $R^2$ is a substituted or unsubstituted alkyl or aryl group; $R^3$ is an alkyl group, a halogen atom or a group of —N—$R^5$ (wherein each of $R^4$ and $R^5$ is a substituted or unsubstituted alkyl or aryl group); M is a transition metal atom; and n is an integer of 0–3.

(19)

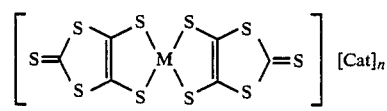

in which [Cat] is a cation required for formation of a neutralized complex salt; M is Ni, Cu, Co, Pd or Pt; and n is 1 or 2.

(20)

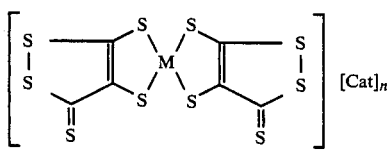

in which [Cat] is a cation required for formation of a neutralized complex salt; M is Ni, Cu, Co, Pd or Pt; and n is 1 or 2.

(21)

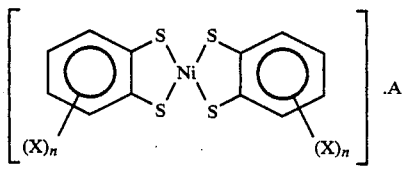

in which X is a hydrogen atom, chlorine atom, bromine atom or methyl group; n is an integer of 1 to 4; and A is quaternary ammonium group.

(22)

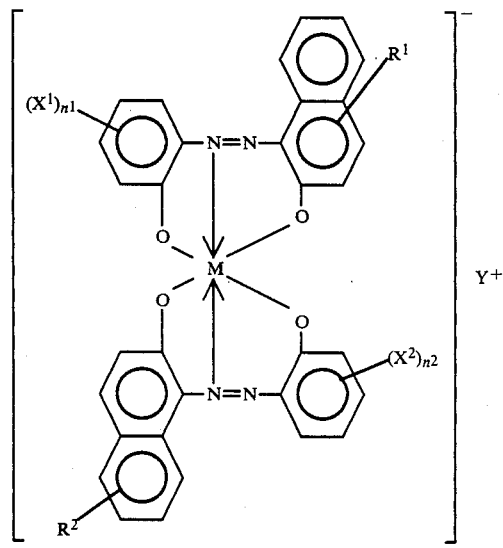

in which each of $X^1$ and $X^2$ is a nitro group and/or a halogen atom; each of $n_1$ and $n_2$ is an integer of 1 to 3; each of $R^1$ and $R^2$ is an amino group, a monoalkylamino group, a dialkylamino group, acetylamino group, a benzoylamino group (including a substituted benzoylamino group); $X^1$ and $X^2$ are the same or different from each other; $n_1$ and $n_2$ are the same or different from each other; $R^1$ and $R^2$ are the same or different from each other; M is Cr or Co; Y is hydrogen, sodium, potassium, ammonium (including substituted aliphatic ammonium) or an aliphatic ammonium.

Naphthoquinone dye, Anthraquinone dye:

(23)

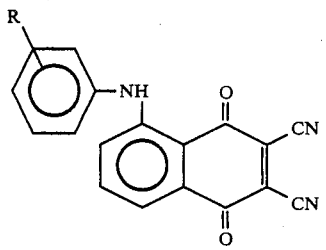

in which R is hydrogen atom, an alkyl group, an allyl group, an amino group or a substituted amino group.

(24)

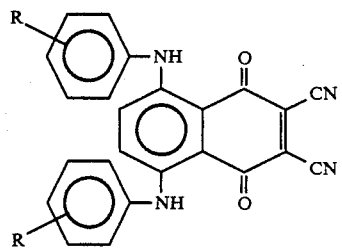

in which R is a hydrogen atom, an alkyl group, an allyl group, an amino group or a substituted amino group.

(25)

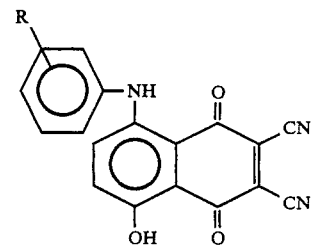

in which R is a hydrogen atom, an alkyl group, an allyl group, an amino group or a substituted amino group.

(26)

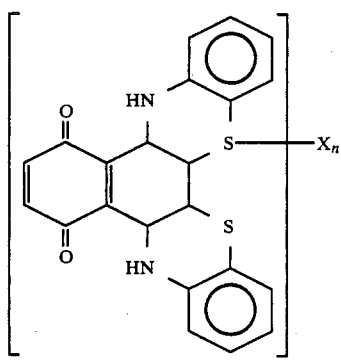

in which X is a halogen atom; and n is an integer of 0 to 10.

(27)

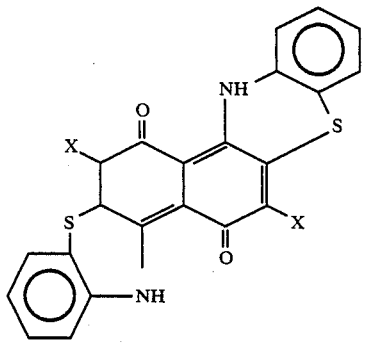

in which X is a halogen atom.

(28)

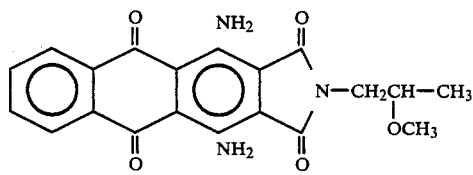

Among the above-mentioned dyes, cyanine dyes are most preferably used in the present invention. The above-mentioned dyes can be employed singly or in combination. In the case of using a cyanine dye, the above-described metal complex salt dye, aminium dye or diimmonium dye may be employed as a quencher in combination with the cyanine dye.

The formation of the recording layer can be done by dissolving the above-mentioned dye (as well as a binder, if desired) in a solvent to prepare a coating solution, then coating the solution over the surface of the substrate, and drying the coated layer.

As the a solvent for preparing a coating solution, diacetone alcohol is used singly or in combination with other solvents as is the same as the solvent for the formation of the intermediate layer. It is preferable that diacetone alcohol should be contained at least 10 weight % in a total amount of a solvent when diacetone alcohol is used in combination with other solvents.

Diacetone alcohol hardly dissolves the plastic materials employed for the preparation of a substrate. However, it has considerable dissolving power for a dye or a binder polymer.

Especially for the cyanine dye, the acetone alcohol has a high dissolving power.

The above-described diacetone alcohol can be employed independently or in combination with one or more other solvents in the range of amount described above. The solvents employable in combination with diacetone alcohol can be those employable with diacetone alcohol for the formation of intermediate layer. The coating solution for the formation of the recording layer may further contain additives such as an antioxidant, a UV-absorbent, a plasticizer and a lubricant according to the purpose.

Examples of the binder polymers employable for the formation of the recording layer include natural organic polymer materials such as gelatin, cellulose derivative, dextran, rosin and rubber; synthetic organic polymer materials such as hydrocarbon resins (e.g., polyethylene, polypropylene, polystyrene and polyisobutylene), vinyl resins (e.g., polyvinyl chloride, polyvinylidene chloride and vinyl chloride/vinyl acetate copolymer), acrylic resins (e.g., polymethyl acrylate and polymethyl methacrylate), and precondensates of thermosetting resins (e.g., polyvinyl alcohol, chlorinated polyethylene, epoxy resin, butyral resin, rubber derivatives, and phenol formaldehyde resin).

When the binder is used for the formation of the recording layer, the ratio of the dye to the binder is generally in the range of 0.01 to 99 wt. %, preferably 1.0 to 95 wt. %.

The coating procedure can be carried out by a conventional method such as spray coating, spin coating, dip coating, roll coating, blade coating, doctor roll coating or screen printing.

The recording layer may be in the form of a single layer or plural layers, and in any case, the thickness of the recording layer is generally in the range of 0.01 to 10 $\mu m$, preferably in the range of 0.02 to 1 $\mu m$. The recording layer may be provided on only one surface of the substrate or both surfaces of the substrate.

On the recording layer may be provided a reflecting layer for the purpose of increasing the S/N ratio in the reproduction procedure of information or improving sensitivity in the recording procedure.

The reflecting layer is essentially composed of a light-reflecting material. The light-reflecting material has a high reflectance for the laser beam. Examples of the light-reflecting materials include metals and semi-metals such as Mg, Se, Y, Ti, Zr, Hf, V, Nb, Ta, Cr, Mo, W, Mn, Re, Fe, Co, Ni, Ru, Rh, Pd, Ir, Pt, Cu, Ag, Au, Zn, Cd, Al, Ga, In, Si, Ge, Te, Pb, Po, Sn and Bi. Preferred are Al, Cr and Ni. These materials can be used alone or in combination. Alloys thereof can be also employed.

The reflecting layer can be formed on the recording layer using the light-reflecting material according to a known method such as deposition, sputtering or ion plating. The thickness of the reflecting layer is generally in the range of 100 to 3,000 angstroms.

The reflecting layer may be provided between the substrate and the recording layer, and in this case, the recording and reproduction of information is carried out from the recording layer side, namely the opposite side of the substrate side.

A protective layer may be further provided on the recording layer (or the reflecting layer) to physically or chemically protect the recording layer. The protective layer can be also provided on the surface of the substrate where the recording layer is not provided to enhance a resistance to scratch or humidity. As material of the protective layer, there can be mentioned inorganic materials such as SiO, $SiO_2$, $MgF_2$ and $SnO_2$; and organic materials such as thermoplastic resins, thermosetting resins and UV-curable resins.

The protective layer can be formed on the recording layer (or on the reflecting layer) or the substrate by laminating a plastic film having been prepared by extrusion over any of those layers and/or on the substrate by way of an adhesive layer. Otherwise, a method of vacuum deposition, sputtering or coating can be also applied to form the protective layer. In the case of using the thermoplastic resin or the thermosetting resin as material of the protective layer, the resin is dissolved in an appropriate solvent to prepare a coating solution, and the solution is coated over the recording layer and/or the substrate. The coated layer is then dried to form a protective layer. In the case of using the UV-curable resin, a solution of the resin in an appropriate solvent is coated over the recording layer and/or the substrate, and the coated layer of the solution is irradiated with ultraviolet rays to cure the layer so as to form a protective layer. In any case, the coating solution may further contain a variety of additives such as an antistatic agent, an antioxidant and a UV-absorbent according to the purpose.

The thickness of the protective layer is generally in the range of 0.1 to 100 μm.

The structure of the information recording medium prepared by the process of the present invention is by no means limited to the above-mentioned structure, and other structures can be also prepared. For example, there can prepared an information recording medium in which two substrates having the above-mentioned constitution and interposing the recording layer are combined using an adhesive, or an information recording medium of air-sandwich structure in which two disc-shaped substrates, at least one of those substrates having the above-mentioned constitution, are combined with each other by way of a ring-shaped outer spacer and a ring-shaped inner spacer so as to form a closed space surrounded by the two substrates and the two spacers.

Examples of the invention and a comparison example are given below, but these examples by no means restrict the invention.

EXAMPLE 1

Coating Solution Containing Chlorinated Polyolefin

| | |
|---|---|
| Chlorinated polyehylene (molecular weight: 8,000, ratio of chlorination: 68%) | 2 weight parts |
| Diacetone alcohol/methyl ethyl ketone = 10/1 (in volume) | 998 weight parts |

To a disc-shaped polycarbonate substrate having a pregroove (outer diameter: 130 mm, inner diameter: 15 mm, thickness: 1.2 mm, track pitch: 1.6 μm, depth of groove: 800 angstroms) was applied a coating solution containing the above-described chlorinated polyethylene by means of spin coating at 1,000 rpm to give a coated layer. The coated layer was dried to form an intermediate layer having thickness of 500 angstroms.

Cyanine dye:

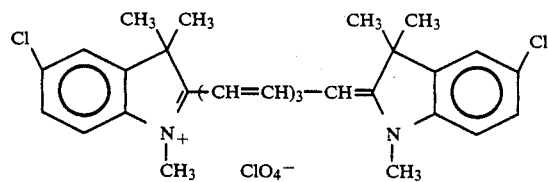

A coating solution was prepared by dissolving 1 weight part of a cyanine dye in 99 weight parts of diacetone alcohol.

The coating solution containing the dye was coated on the intermediate layer described above by means of spin coating at 1,000 rpm to give a coated layer of the solution, and the coated layer was dried at 70° C. for 10 minutes to form a recording layer having dry thickness of 600 angstrtoms.

Thus, an information recording medium consisting of a substrate, an intermediate layer and a recording layer, superposed in order, was prepared.

EXAMPLE 2

The procedure of Example 1 was repeated except for not providing the intermediate layer but directly coating the above-described coating solution containing the dye on the substrate, to prepare an information recording medium consisting of a substrate, an intermediate layer and a recording layer, superposed in order.

EXAMPLE 3

The procedure of Example 1 was repeated except for using a metallic recording layer. In the formation of the metallic recording layer, In, GeS and Au were co-deposited in such manner that the amounts of In, GeS and Au would be 66 wt. %, 22 wt. % and 12 wt. %, respectively, on the intermediate layer to form the recording layer having the thickness of 300 angstrom, to prepare an information recording medium consisting of a substrate, an intermediate layer and a recording layer, superposed in order.

COMPARISON EXAMPLE 1

The procedure of Example 1 was repeated except for replacing the solvent for the coating solution for the formation of an intermediate layer and a recording layer, with methyl ethyl ketone to prepare an information recording medium consisting of a substrate, an intermediate layer, and a recording layer.

Evaluation of Information Recording Medium

A recording layer of each information recording medium obtained in the above-described examples was observed by a microscope. The recording layer of the recording medium prepared in each of Examples 1 to 3, it was observed that the pregroove was well preserved with no deformation and that the plainness of the recording layer was favorable. On the other hand, the recroding layer of the recording medium of Comparison Example 1, it was observed that the pregroove of the substrate was deformed.

In each of the recording medium, an information was recorded by applying a laser beam to the recording layer through the substrate. Thereafter, the recorded information was reproduced in a conventional manner. In the course of the reproduction, tracking errors were frequently observed in the recording medium of Comparison Example 1, while almost no tracking error was observed in the recording media of Examples 1 to 3.

We claim:

1. A process for the preparation of an information recording medium which comprises the steps of:
    coating a solution which contains a dye in a solvent containing at least 10 weight % of diacetone alcohol over a polycarbonate substrate having a pregroove thereon; and
    drying thus coated layer on the substrate to form a recording layer.

2. The process as claimed in claim 1, wherein said solvent contains diacetone alcohol at least 50 weight %.

3. The process as claimed in claim 1, wherein said dye is at least one dye selected from the group consisting of a cyanine dye, a phthalocyanine dye, a pyrylium dye, a thiopyrylium dye, a squarillium dye, an azulenium dye, an indophenol dye, an indoaniline dye, a triphenylmethane dye, a quinone dye, an aminium dye, a diimmonium dye and a metal complex salt dye.

4. A process for the preparation of an information recording medium which comprises the steps of:

coating a solution which contains a polymer in a solvent containing at least 10 weight % of diacetone alcohol over a polycarbonate substrate having a pregroove thereon;

drying thus coated layer to form an intermediate layer; and forming an information recording layer on the intermediate layer.

5. The process as claimed in claim 4, wherein said solvent contains at least 50 wt. % of diacetone alcohol.

6. The process as claimed in claim 4, wherein said polymer is at least one polymer selected from the group consisting of polymethyl methacrylate, acrylic acid/methacrylic acid copolymer, styrene/maleic anhydride copolymer, styrene/vinyltoluene copolymer, chlorinated polyethylene, chlorosulfonated polyethylene, nitrocellulose, polyvinyl chloride, polyimide, vinyl acetate/vinyl chloride copolymer, ethylene/vinyl acetate copolymer, polyethylene, polypropylene, and polycarbonate.

7. The process as claimed in claim 4, wherein said recording layer contains is at least one dye selected from the group consisting of a cyanine dye, a phthalocyanine dye, a pyrylium dye, a thiopyrylium dye, a squarillium dye, an azulenium dye, an indophenol dye, an indoaniline dye, a triphenylmethane dye, a quinone dye, an aminium dye, a diimmonium dye and a metal complex salt dye.

* * * * *